US012385306B2

(12) United States Patent
Edokpayi

(10) Patent No.: US 12,385,306 B2
(45) Date of Patent: Aug. 12, 2025

(54) ADJUSTABLE BREAKOUT DEVICE

(71) Applicant: Overhead Door Corporation, Lewisville, TX (US)

(72) Inventor: Frank Isioma Edokpayi, Corpus Christi, TX (US)

(73) Assignee: Overhead Door Corporation, Lewisville, TX (US)

( * ) Notice: Subject to any disclaimer, the term of this patent is extended or adjusted under 35 U.S.C. 154(b) by 0 days.

(21) Appl. No.: 18/680,515

(22) Filed: May 31, 2024

(65) Prior Publication Data

US 2025/0146343 A1 May 8, 2025

Related U.S. Application Data

(60) Provisional application No. 63/597,234, filed on Nov. 8, 2023.

(51) Int. Cl.

*E05D 15/48* (2006.01)
*E05D 15/06* (2006.01)
*E05D 15/58* (2006.01)

(52) U.S. Cl.

CPC ......... *E05D 15/48* (2013.01); *E05D 15/0604* (2013.01); *E05D 15/58* (2013.01); *E05D 2015/485* (2013.01); *E05D 2015/586* (2013.01); *E05Y 2900/132* (2013.01)

(58) Field of Classification Search

CPC ..... E05D 15/48; E05D 15/485; E05D 15/586; E05D 15/58; E05D 15/0604; E05Y 2900/132

See application file for complete search history.

(56) References Cited

U.S. PATENT DOCUMENTS

| | | | | |
|---|---|---|---|---|
| 3,300,897 A * | 1/1967 | Wikkerink | E06B 3/5072 | 49/141 |
| 3,464,159 A * | 9/1969 | Hewitt | E06B 3/5072 | 49/360 |
| 3,750,334 A * | 8/1973 | Slaybaugh | E05D 15/0604 | 49/177 |
| 6,058,665 A * | 5/2000 | Halvorson, Jr. | E06B 1/524 | 49/260 |
| 7,228,659 B2 * | 6/2007 | Romero | E05D 15/48 | 16/268 |
| 9,624,705 B2 * | 4/2017 | Haab | E05D 15/264 | |
| 2014/0150208 A1 * | 6/2014 | Haab | E05D 7/00 | 16/86.2 |
| 2022/0154521 A1 * | 5/2022 | Schneider | E05B 65/0835 | |

* cited by examiner

*Primary Examiner* — Justin B Rephann

(74) *Attorney, Agent, or Firm* — Haynes and Boone, LLP

(57) ABSTRACT

A sliding door system is disclosed which includes an adjustable breakout device that is configured to change the suspension angle of one or more door panels of the sliding door system. The adjustable breakout device may include a support bar configured to extend vertically along the door panel, a housing configured to be mounted on an upper portion of the support bar, a bracket configured to be mounted on the upper portion of the support bar and within a portion of the housing, a set screw configured to pass through the housing and through the upper portion of the support bar, and a pivot configured to pass through the bracket. The set screw may be adjusted to cause the support bar to rotate about the pivot and therefore change the suspension angle of the one or more door panels.

20 Claims, 17 Drawing Sheets

ADJUSTABLE BREAKOUT DEVICE

PRIORITY

This application claims the benefit of the filing date of U.S. Provisional Application No. 63/597,234, filed Nov. 8, 2023, which is incorporated herein by reference in its entirety.

This application is related to U.S. application Ser. No. 18/680,391 filed May 31, 2024, entitled "Breakout Crawl Arrester" and U.S. application Ser. No. 18/680,939 filed May 31, 2024, entitled "Adjustable Floor Mounted Pivot Plate", which are both incorporated by reference herein in their entirety.

TECHNICAL FIELD

The present disclosure relates generally to sliding door systems, and more particularly to sliding door systems with breakout functionality. In particular, the sliding door system may include an adjustable breakout device that lends support to the panels of the door during a breakout procedure.

BACKGROUND

Sliding door systems are sometimes used as entryways and exits to intensive care units ("ICU") and critical care units in hospitals, among other places. In particular, patient rooms in these units are often equipped with large manual sliding doors. The doors are often glass (sometimes in aluminum door frames) to allow medical professionals a view of the patients that need round-the-clock monitoring. Because stretchers, wheelchairs, and other medical equipment are frequently moved in and out of the ICU, sliding doors are often employed. ICUs and other hospital facilities also have certain environmental standards that should be maintained to ensure a healthy environment for patient recovery which impact the type of doors available for use. For example, in certain ICUs, the sliding doors do not have tracks to reduce the ingress of contaminants. For example, many intensive care units have sliding doors that are supported without a bottom track that is fixed to the floor. In these types of doors, the upper track provides the primary support and guides the linear motion of the door as it slides to open and close. However, this design can involve putting a large amount of weight on only a few small components of the door, which may lead to wear and damage over time, as well as decreased functionality of the doors.

Another requirement of some sliding doors such as those used in a hospital application is the ability to "breakout." That is, these doors should have the ability to rotate off the track, so that a pushing force will cause the door to swing open. The terms "breakout," "breakaway," and "swingout" refer to the ability of the door to be opened by rotating the panels of the door off of the track, as opposed to the normal sliding motion of the panels. The breakout feature may be employed in various circumstances such as for an emergency or to accommodate larger equipment such as gurneys or patient beds, and should be able to be accomplished without requiring detailed knowledge of the workings of the door or specific steps that must be followed to allow emergency egress through a telescoping sliding door that has been broken away.

However, many existing breakout doors are problematic because they lack sufficient support for the weight required for the breakout door panels. For example, breakout doors are generally only supported by one or two support points. The components bearing this weight may wear out over time and cause damage to the door system and floor beneath.

Another limiting aspect to many breakout capable sliding doors is that the weight distribution for the door system is set at installation. Once the door is built, the breakout system is set and consequently cannot be adjusted in the field. Many of these sliding door systems experience imbalances during breakout procedures that may cause damage to the door panels or floor over time. Therefore, needs exist for more robust telescoping doors with breakout functionality that are adjustable.

SUMMARY

One or more of the foregoing needs may be met by embodiments in accordance with the present disclosure, wherein, embodiments may include an adjustable breakout device for use with a sliding door system. The adjustable breakout device may include: a support bar configured to extend vertically with respect to a door panel of the sliding door system; a housing configured to be mounted on an upper portion of the support bar; a bracket configured to be mounted on the upper portion of the support bar and within a portion of the housing; a set screw configured to pass through the housing and through the upper portion of the support bar, such that the set screw bears against a proximal end of the housing; and a pivot configured to pass through a first protrusion of the bracket, the support bar, and a second protrusion of the bracket, respectively, wherein when the set screw is turned to put pressure on the proximal end of the housing, the support bar rotates about the pivot.

In some implementations, the support bar is configured to be mounted within a vertical rail of the door panel of the sliding door system. The support bar rotating about the pivot may impart a change in a suspension angle of the door panel. The first protrusion and the second protrusion of the bracket may form a U shape configured to extend around the support bar. The bracket further may further include a bar extending approximately horizontally with respect to the door panel, the bracket comprising a proximal end of which is connected to the U shape formed by the first and second protrusions of the bracket.

In some implementations, the bar of the bracket is configured to be mounted to a horizontal rail of the door panel. The upper portion of the support bar may include a first flat region and a second flat portion on an opposite side of the support bar as the first flat region. The first protrusion may be aligned with the first flat region and the second protrusion may be aligned with the second flat region. The housing may include a first sidewall and a second sidewall opposite the first sidewall, wherein the first sidewall is aligned with the first flat region and the second sidewall is aligned with the second flat region. The housing may include a third sidewall perpendicular to the first and second sidewalls, wherein the third sidewall comprises a first hole that is sized for the set screw to pass therethrough. The set screw may be configured to pass through the first hole of the housing and through a second hole in the upper portion of the support passing between the first and second flat regions.

A sliding door system with breakout functionality is also provided, which may include: a first door panel configured to be mounted to a top rail, the first door panel comprising a first pivot point about which the first door panel is configured to rotate in a breakout procedure; a second door panel configured to be mounted to the top rail, the second door panel configured to slide linearly with respect to the first door panel, the second door panel comprising a second pivot point about which the second door panel is configured to rotate in a breakout procedure; an adjustable breakout system mounted on a vertical rail of the second door panel, the adjustable breakout system including: a support bar configured to extend along the vertical rail of the second door panel; a housing configured to be mounted on an upper portion of the support bar; a bracket configured to be mounted on the upper portion of the support bar and within a portion of the housing; a set screw configured to pass through the housing and through the upper portion of the support bar, such that the set screw bears against a proximal end of the housing; and a pivot configured to pass through the bracket and the support bar, wherein an angle at which the second door panel hangs with respect to the top rail is changed when the set screw is turned, which in turn causes the support bar to rotate about the pivot.

In some implementations, the bracket includes a first protrusion and a second protrusion forming a U shape that is configured to extend around the support bar. The bracket may also include a bar extending approximately horizontally, the proximal end of which is connected to the U shape formed by the first and second protrusions of the bracket. The bar of the bracket may be configured to be mounted to a horizontal rail of the second door panel. The upper portion of the support bar may include a first flat region and a second flat portion on an opposite side of the support bar as the first flat region. A first protrusion of the bracket may be aligned with the first flat region and a second protrusion of the bracket is aligned with the second flat region.

A method for adjusting a sliding door system with breakout functionality is also provided, which may include: providing a door panel of the sliding door system, the door panel suspended from a mounting rail; providing an adjustable breakout device mounted on the door panel, the adjustable breakout device comprising a support bar configured to extend vertically along the door panel, a housing configured to be mounted on an upper portion of the support bar, a bracket configured to be mounted on the upper portion of the support bar and within a portion of the housing, a set screw configured to pass through the housing and through the upper portion of the support bar, and a pivot configured to pass through the bracket and the support bar; determining a desired angular change to an angle at which the door panel is suspended from the mounting rail; and turning the set screw of the adjustable breakout device to bear against an inner wall of the housing with a steel block to change the angle at which the door panel is suspended from the mounting rail to achieve the desired angular change.

The method may also include mounting the bracket to a horizontal rail of the door panel. The method may include turning the set screw by accessing the set screw though a hole in the housing.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Additional features, advantages, and aspects of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate aspects of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION

Figure 1:
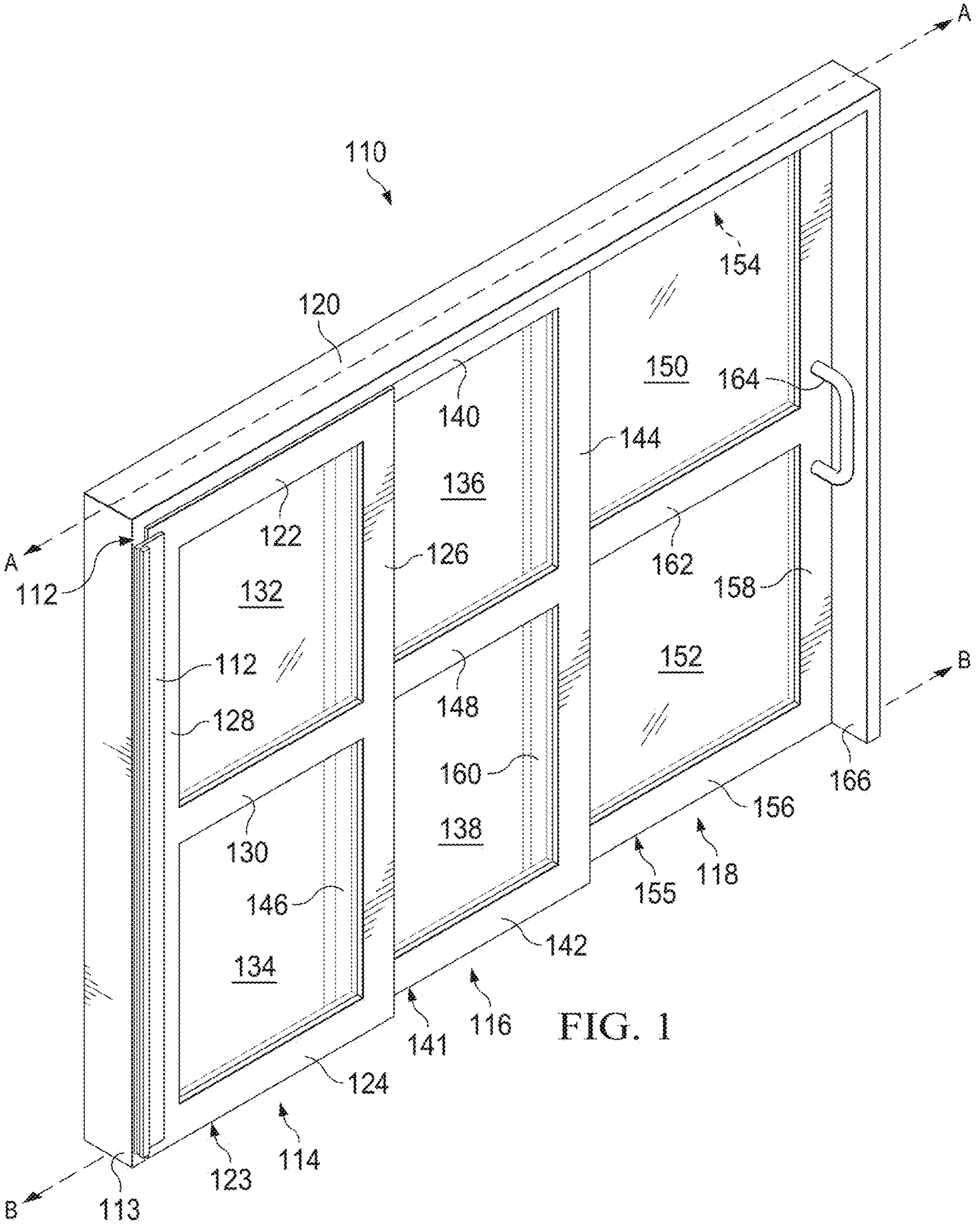
FIG. 1 shows a perspective view of a telescoping door system according to an embodiment of the present disclosure.

The aspects of the disclosure and the various features and advantageous details thereof are explained more fully with reference to the non-limiting aspects and examples that are described and/or illustrated in the accompanying drawings and detailed in the following description. It should be noted that the features illustrated in the drawings are not necessarily drawn to scale, and features of one aspect may be employed with other aspects as the skilled artisan would recognize, even if not explicitly stated herein. Descriptions of well-known components and processing techniques may be omitted so as to not unnecessarily obscure the aspects of the disclosure. The examples used herein are intended merely to facilitate an understanding of ways in which the disclosure may be practiced and to further enable those of skill in the art to practice the aspects of the disclosure. Accordingly, the examples and aspects herein should not be construed as limiting the scope of the disclosure, which is defined solely by the appended claims and applicable law. Moreover, it is noted that like reference numerals represent similar parts throughout the several views of the drawings.

FIG. 1 is a perspective view of a sliding door system (such as a telescoping door system) 110 which may include door panels 114, 116, 118 (which may also be referred to as doors). In particular, the telescoping door system 110 may include a sidelite panel 114, a slow slide panel 116, and a fast slide panel 118. The panels or door panels 116, 118 are slidable and all panels 114, 116, and 118 are able to pivot (i.e., suitable for breakout). When the panels 116 and 118 are slid to the closed position, this may be referred to as the slide closed position as shown in FIG. 1. The sidelite panel 114 is coupled to the trailing door jamb 113 for pivotal movement, however, the sidelite panel 114 does not move linearly. The slide panels 116, 118 are also known as the Swing Slide or "SX," panels or doors and the sidelite panel 114 is known as the Swing Only or "SO" panel or door.

The teachings of the present disclosure are not limited to any type of telescoping door system, but are applicable to any type of sliding door system in general This may include the three-panel telescoping door system shown in the figures, and may be also employed with a dual-panel slide/swing door system. In this case, the telescoping door system 110 would include a single sliding door panel (such as 116) as well as a nonsliding door panel (such as 114). In other implementations, two, three, or more than three door panels may be included in the telescoping door system 110.

In some implementations, the door panels 114, 116, 118 are arranged to extend in approximately the same direction such that the door panels 114, 116, 118 may be configured to fully or partially close a doorway. In particular, the sidelite panel 114 may be configured to stay relatively motionless during opening or closing of the door system 110, whereas slide panels 116, 118 are configured to move relative to the first door panel 114. The slow slide panel 116 is immediately coupled to the sidelite panel 114, and the fast slide panel 118 is immediately coupled to and leads the slow slide panel 116. The slide panels 116, 118 and the sidelite panel 114 may be supported by a header 120. The header 120 may include a track that guides the linear motion of the slide panels 116, 118 of the telescoping door system 110 (i.e., along path A as shown in FIG. 1). According to certain embodiments, the header 120 may be aluminum or nylon covered aluminum. The slide panels 116, 118 move linearly with respect to the sidelite panel 114 in a telescoping manner with the fast slide panel 118 leading and controlling the linear movement of the slow slide panel 116. This linear movement may also be referred to as sliding movement. The bottom of the slow slide panel 116 may also be guided by a track that is generally located on the underside of the sidelite panel 114 (i.e., running along path B as shown in FIG. 1). The bottom of the fast slide panel 118 is guided by a track formed in a bottom rail 142 of the slow slide panel 116.

Figure 2:
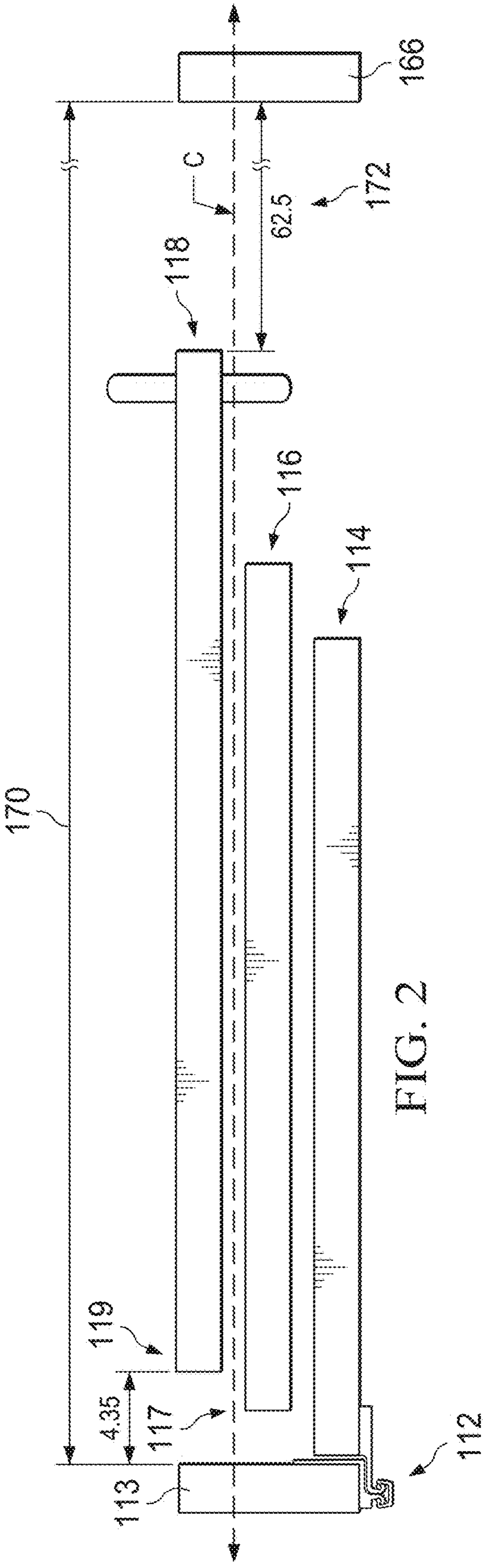
FIG. 2 is an illustration of a top view of the telescoping door system shown in FIG. 1 in a standard (or non-breakout) position according to an embodiment of the present disclosure.
Figure 3:
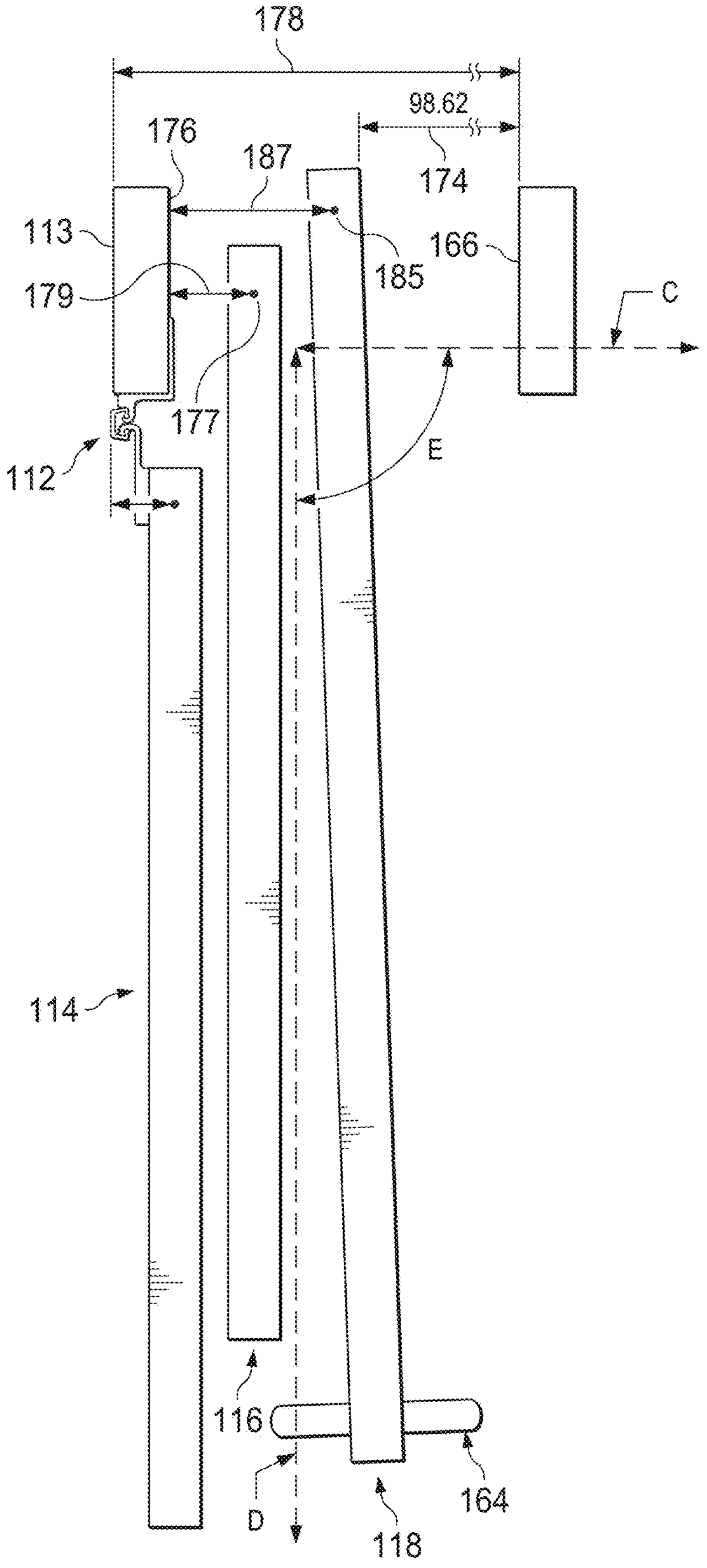
FIG. 3 is an illustration of a top view of the telescoping door system shown in FIG. 1 shown in a breakout position according to an embodiment of the present disclosure.

With reference to FIGS. 1-5, the telescoping door system 110 may also include a breakout hinge 112 that allows the panels 114, 116, 118 of the door system 110 to be broken out. When broken out, the panels 114, 116, 118 are able to rotate about the breakout hinge 112 along path E (shown in FIGS. 3 and 5). Breaking out the panels 114, 116, 118 may create a large opening through which oversized equipment, furniture, and the like may fit through. While a specific type of hinge 112 (swing clear continuous geared hinge) is shown in FIG. 2 and FIG. 3, any typical hinge 112 (piano, pin, or any other suitable hinge) may be used as appreciated by one of ordinary skill in the art after reviewing this disclosure.

FIG. 2 is a schematic of a top, plan view of the telescoping door system 110 illustrating the distances of the various panels 114, 116, 118 with respect to the door jambs 113, 166 to illustrate the fully open position (sometimes referred to as the slide open position) of the telescoping door system 110. The area between the lead jamb 166 and the trailing jamb 113 is referred to as the clear opening 170. According to one embodiment, the distance of the clear opening 170 may be 100-120 inches, for example 108 inches. Each of the door panels 114, 116, 118 is disposed in the clear opening 170, and a portion of the clear opening 170 defines the slide opening 172 and the breakout opening 174 (also referred to as a pivot opening or a swing opening) (see FIG. 3). The slide opening 172 is present and at its greatest length when the slide panels 116, 118 are fully slid open linearly. That is, the slow slide panel 116 and the fast slide panel 118 are each positioned linearly closest to the trailing jamb 113. The panels 114, 116, 118 of the telescoping door system 110 may be configured to slide along line C as shown in FIG. 2.

FIG. 3 illustrates a schematic of a top, plan view of the telescoping door system 110 which has been broken out. In particular, the panels 114, 116, 118 have been pivoted such from their original arrangement along line C to a breakout line D (where angle E is the angle between lines C and D). This breakout position forms breakout opening 174. The pivot motion of the sidelite panel 114 is facilitated by the hinge 112. The breakout opening 174 illustrated in FIG. 3 is created when each of the slide panels 116, 118 are positioned closest to the trailing jamb 113 and each of the slide panels 116, 118 and the sidelite panel 114 are pivoted such the panels 114, 116, 118 are rotated approximately 90 degrees toward the sidelite side of the clear opening 170. In other implementations, the panels 114, 116, 118 may be rotated less than 90 degrees in a breakout position.

In this breakout position, the panels 114, 116, 118 cannot be linearly moved with respect to each other to close the slide opening 172. The breakout opening 174 is significantly larger than the slide opening 172. In a hospital, the slide opening 172 is used for ingress and egress of typical foot traffic, but if a bed or other large equipment needs to be moved through the door system 110, the panels 114, 116, 118 may be pivoted to create the larger breakout opening 174.

In some implementations, tracks 123, 141, 155 may be disposed in the underside of each of the door panels 114, 116, 118, respectively. These tracks may be used to constrain and guide the motion of door panels 116, 118 with respect to the other slide panels 114, 116, 118. A pivot assembly may also be included that is disposed within these tracks 123, 141, 155. This pivot assembly is discussed in further detail in the copending application entitled "Adjustable Breakout Device" which is incorporated by reference herein in its entirety.

The sidelite panel 114 may include a top rail 122, a bottom rail 124, a lead rail 126, a trailing rail 128, and a mid-rail 130. An upper pane of glass 132 is framed by a portion of the lead rail 126, the trailing rail 128, the top rail 122, and the mid-rail 130. A lower pane of glass 134 is framed by portions of the lead rail 126, the trailing rail 128, the bottom rail 124, and the mid-rail 130. The slow slide panel 116 similarly includes upper and lower glass panes 136, 138 framed by a top rail 140, a bottom rail 142, a lead rail 144, a trailing rail 146, and a mid-rail 148. The fast slide panel 118 also includes upper glass pane 150 and lower glass pane 152 framed by an upper rail 154, a bottom rail 156, a lead rail 158, a trailing rail 160, and a mid-rail 162. The rails may be made of any suitable material such as steel, other metals, PVC, wood, composites, or the like. However, in certain embodiments a lightweight material, such as aluminum may be used for the various rails of the door system 110. According to an alternate embodiment, each panel may have no glass panes, one glass pane, two glass panes, or more than two glass panes.

A user may move the telescoping door system 110 from a fully open position to a fully closed position by manually applying a force to a handle 164 disposed on the lead rail 158 of the fast slide panel 118 to displace the fast slide panel 118 toward a lead jamb 166. The fast slide panel 118 is linearly displaced a certain distance, and it catches the slow slide panel 116 and displaces it toward the lead jamb 166 until the fast slide panel 118 reaches the lead jamb 166. The fast slide panel 118 may be positively latched to maintain the door system 110 in the fully closed position. To move the telescoping door system 110 from the fully closed position to the fully open position, the reverse occurs when the user applies the force to the fast slide panel 118 to linearly displace it toward the trailing jamb 113 (also referred to herein as a pivot jamb), and after the fast slide panel 118 is linearly displaced a certain distance, it catches the trailing end 117 (see FIG. 2) of the slow slide panel 116 and displaces it toward the trailing jamb 113. Alternatively, the linear motion of the slide panels 116, 118 may be driven by an operator for automatic sliding movement of the panels 116, 118.

In pivoting the panels 114, 116, 118 to form the breakout opening 174, each panel 114, 116, 118 may pivot on its own pivot axis 171, 177, 185, respectively. Each pivot axis 171, 177, 185 location and door system 110 dimensions are selected to allow the other adjacent panels to pivot approximately 90 degrees without the panels 114, 116, 118 interfering with each other.

It should be understood that the slide open limit of the slow slide panel 116 is associated with its pivot axis 177. So, when the slow slide panel 116 is slid open such that its trailing end 117 is positioned closest to the trailing jamb 113, (as shown in FIG. 2) the slow slide panel 116 is in position to allow it to pivot to its breakout position without interfering with the pivot motion of the sidelite panel 114. The same is true for the fast slide panel 118.

As shown in FIG. 3, the pivot axis 177 of the slow slide panel 116 is disposed a distance 179 from the face 176 of the trailing jamb 113 and the pivot motion of the slow slide panel 116 does not interfere with the pivot motion of the sidelite panel 114. Similarly, the pivot axis 177 of the slow slide panel 116 is disposed a closer distance 179 to the face 176 of the trailing jamb 113 than the distance 187 of the pivot axis 185 and the pivot motion of the fast slide panel 118 and does not interfere with the pivot motion of the slow slide panel 116.

Figure 4:
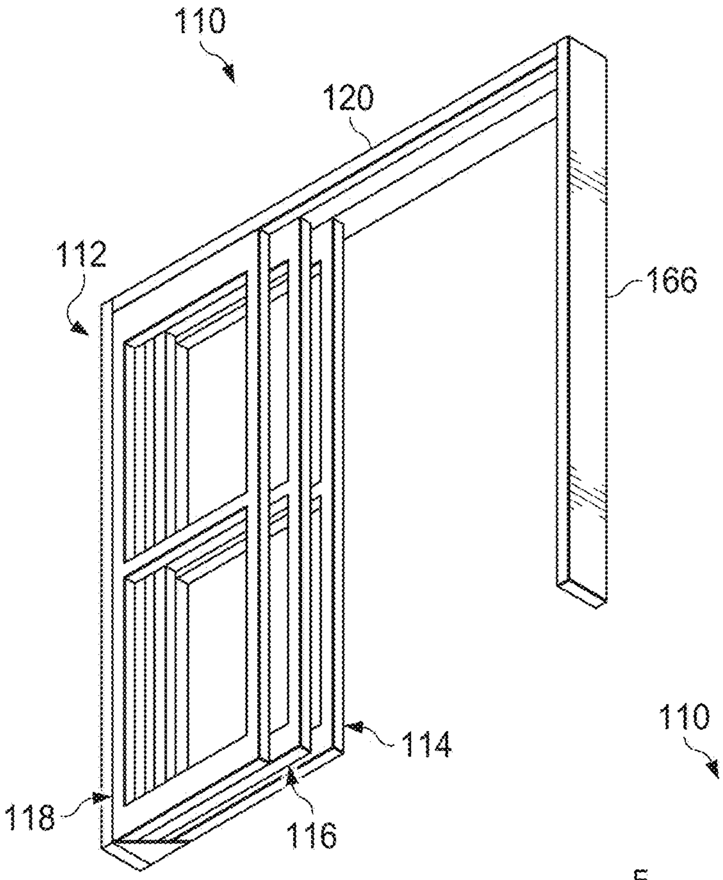
FIG. 4 is a perspective view of a door frame for a door system where the doors are in a non-broken out position according to an embodiment of the present disclosure.
Figure 5:
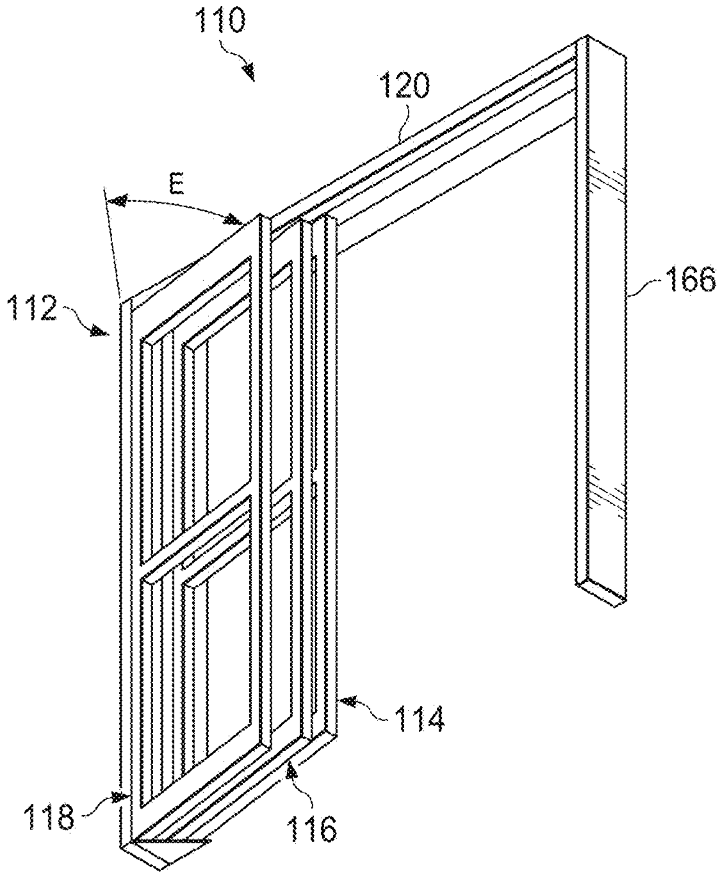
FIG. 5 is a perspective view of a door frame for a door system where the doors are in a broken out position according to an embodiment of the present disclosure.

FIGS. 4 and 5 show a perspective view shown from the bottom from an angle of the door system 110. FIG. 4 shows the door system 110 is a non-broken out or pivot closed position and FIG. 5 shows the door system 110 in a partially broken out or pivot closed position. The door system 110 includes the sidelite panel 114, the slow slide panel 116, and the fast slide panel 118. The header 120 and lead jamb 166 are also shown.

The telescoping door system 110 may also be one half of a dual telescoping door system 110 where a second multi-panel telescoping door is disposed opposite the telescoping door system 110 such that a fully closed position has the two telescoping door systems 110 meeting each other in a center of the door frame or opening.

In some implementations, the telescoping door system 110 may include a floor mounted track passing along path B that may help to guide the linear or sliding motion of the slide panels 116, 118. In other implementations, the telescoping door system may not include a floor mounted track. For example, in certain healthcare facilities such as an intensive care unit in a hospital, it may be undesirable to have a floor track.

In various implementations, the telescoping door system 110 may include one or more features that improve its functionality over existing designs, and in particular, allow the weight distribution of the door to be adjusted, ultimately improving the function of the door. These features include an adjustable breakout device 250 discussed in reference to FIGS. 6-16. These features may also be included in a telescoping door system 110 that is configured for use in various applications. For example, in one implementation, a telescoping door system 110 may be used in a trackless configuration in a hospital that includes an adjustable breakout device 250. In another embodiment, a telescoping door system 110 with an adjustable breakout device 250 may be used in a tracked configuration. The adjustable breakout device 250 may be used with the breakout crawl arrester and adjustable floor mounted pivot plate discussed in copending applications "Breakout Crawl Arrester" and "Adjustable Floor Mounted Pivot Plate" which are incorporated by reference herein in their entirety.

The adjustable breakout device 250 overcomes challenges faced by non-adjustable sliding doors. In particular, in existing sliding door systems, once the door is built, the breakout system is set and consequently cannot be adjusted in the field. Many of these sliding door systems experience imbalances during breakout procedures that may cause damage to the door panels or floor over time. Some sliding door systems have a series of angled machined cuts, one of which is built into the door panel and the angle of the machine cut selected is determined by the width of the door panel. The wider the door panel, the steeper the angle. The angle of the cut may determine the strength of the breakout system, and accordingly, these machined cuts are only suitable to be used for a narrow range of door weights. This means that if a door weight goes outside of that range, the proper functionality of the door is impaired. In the field, this means that some lighter doors are over-powered by the system causing them to lift-up during breakout and the system is underpowered for some heavier doors, causing them to drop and hit the ground at the non-pivot end when the door is broken out. This is a challenge many manufacturers in the door industry faces. In contrast, on-field adjustability of the adjustable breakout device 250 ensures it can cater for a wide range of door weights and can be set to the required strength by the installer. The function of the adjustable breakout device is simple and easily accessible as shown in FIGS. 16-22B.

Figure 6:
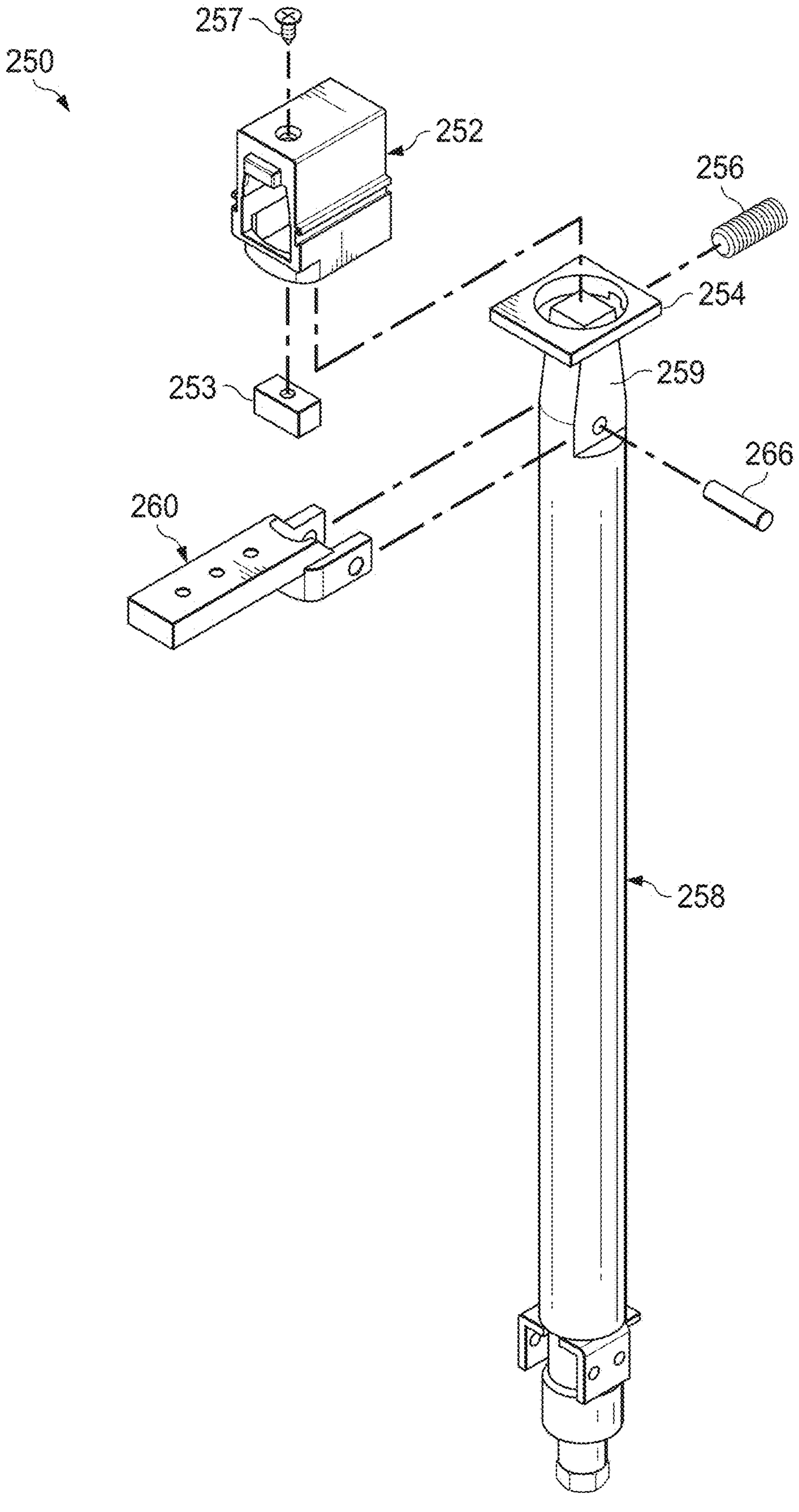
FIG. 6 is an exploded view of an adjustable breakout device according to an embodiment of the present disclosure.
Figure 7:
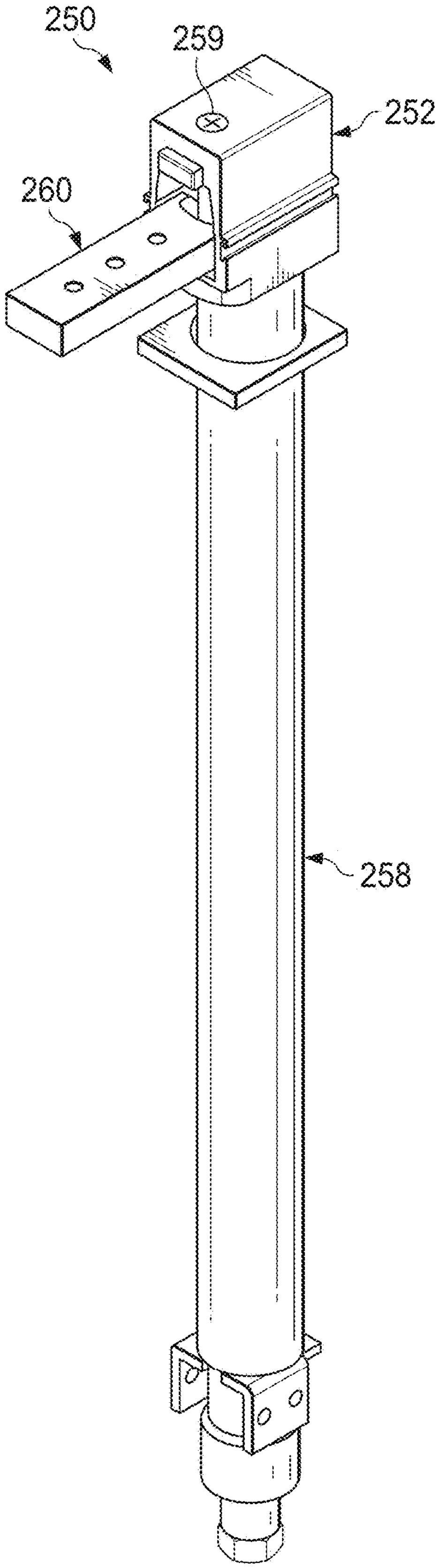
FIG. 7 is a front perspective view of an adjustable breakout device according to an embodiment of the present disclosure.
Figure 8:
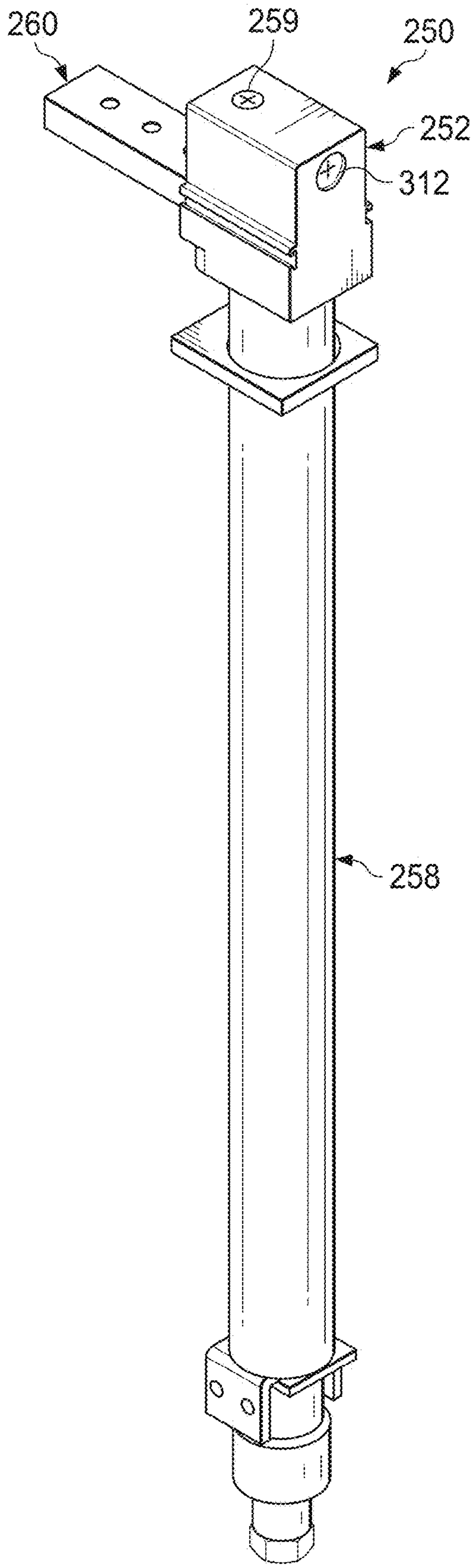
FIG. 8 is a rear perspective view of an adjustable breakout device according to an embodiment of the present disclosure.
Figure 9A:
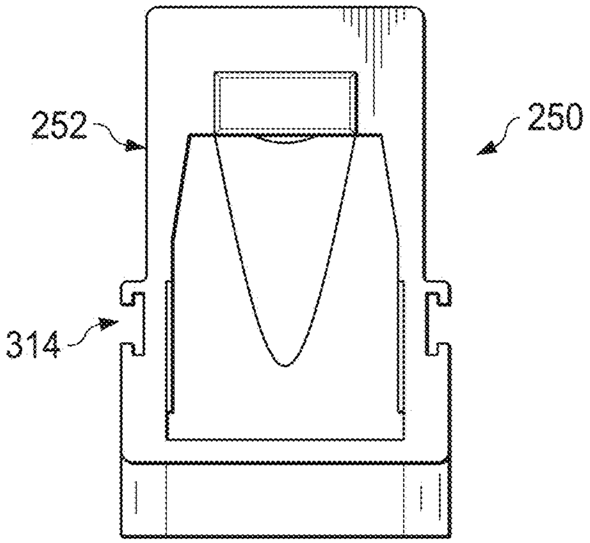
FIG. 9A is a front perspective view of a housing of the adjustable breakout device according to an embodiment of the present disclosure.
Figure 9B:
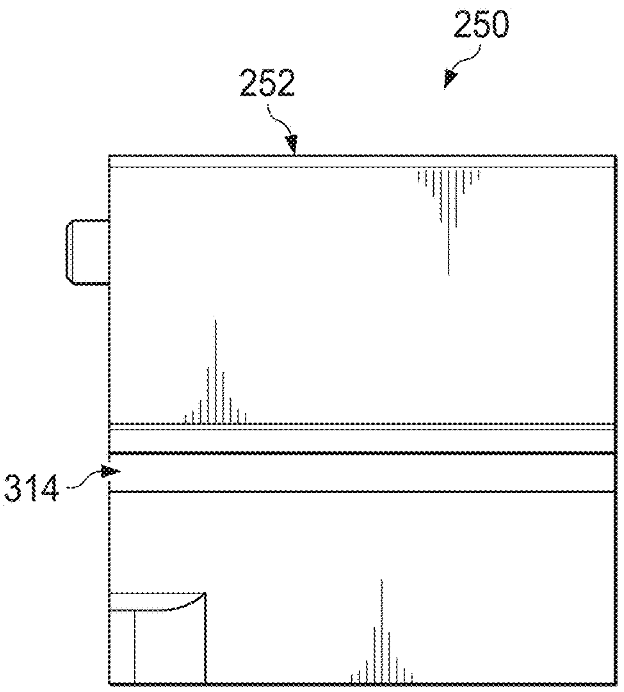
FIG. 9B is a cross-sectional view of a housing of the adjustable breakout device along line F according to an embodiment of the present disclosure.
Figure 9C:
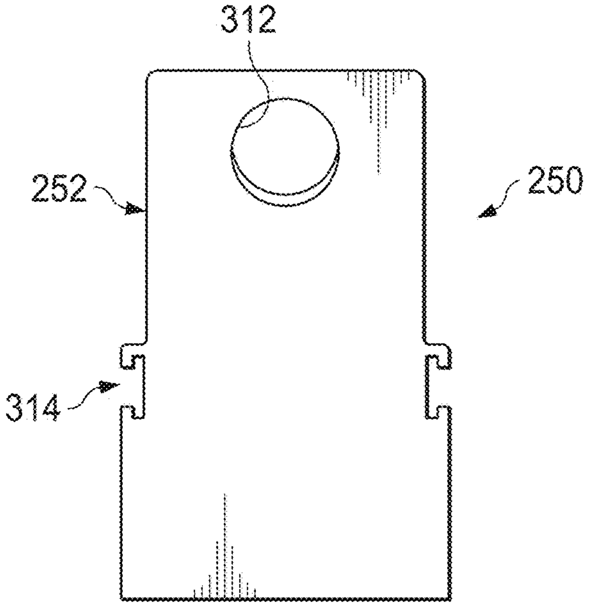
FIG. 9C is a rear perspective view of a housing of the adjustable breakout device according to an embodiment of the present disclosure.
Figure 9D:
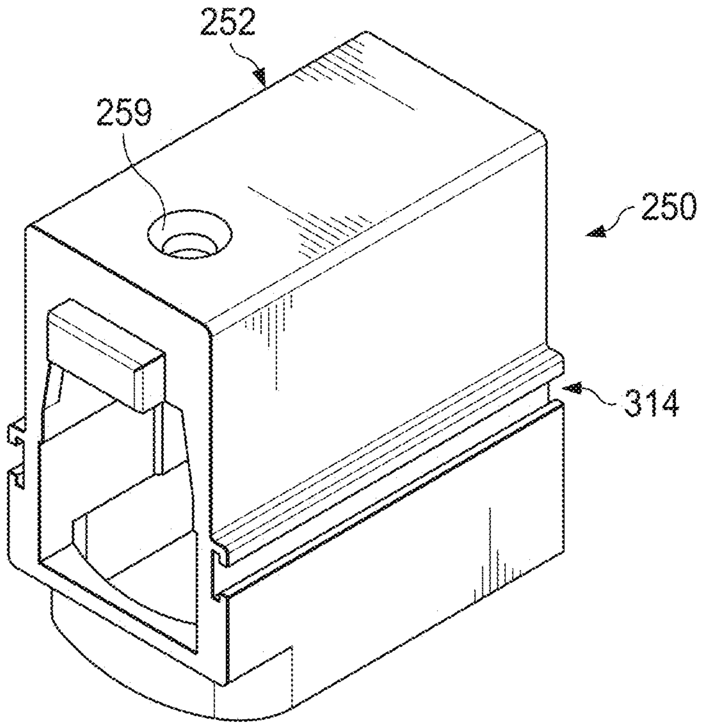
FIG. 9D is a perspective view of a housing of the adjustable breakout device according to an embodiment of the present disclosure.
Figure 9E:
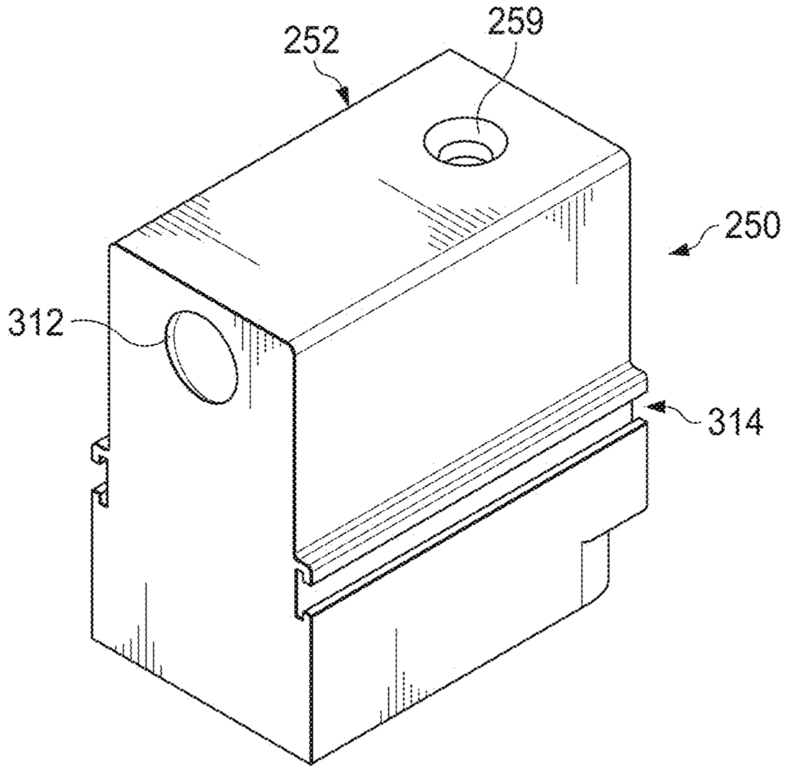
FIG. 9E is a perspective view of a housing of the adjustable breakout device according to an embodiment of the present disclosure.
Figure 10A:
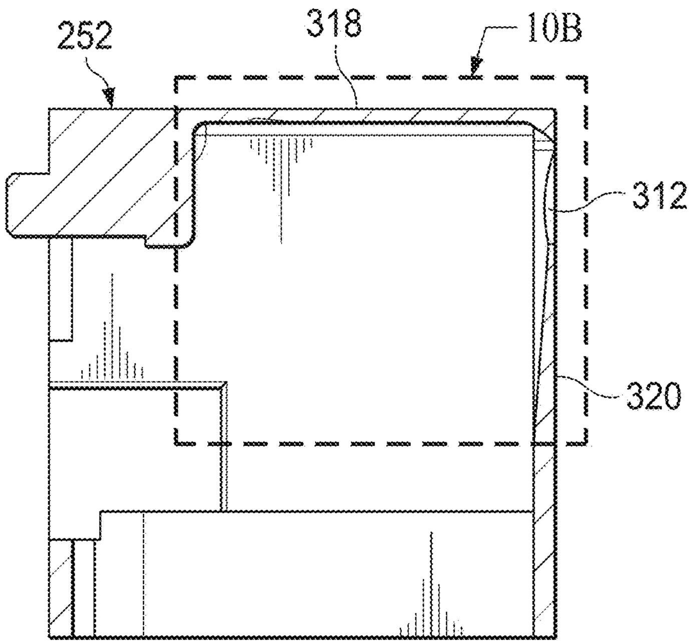
FIG. 10A is a cross-sectional view of the housing of the adjustable breakout device according to an embodiment of the present disclosure.
Figure 10B:
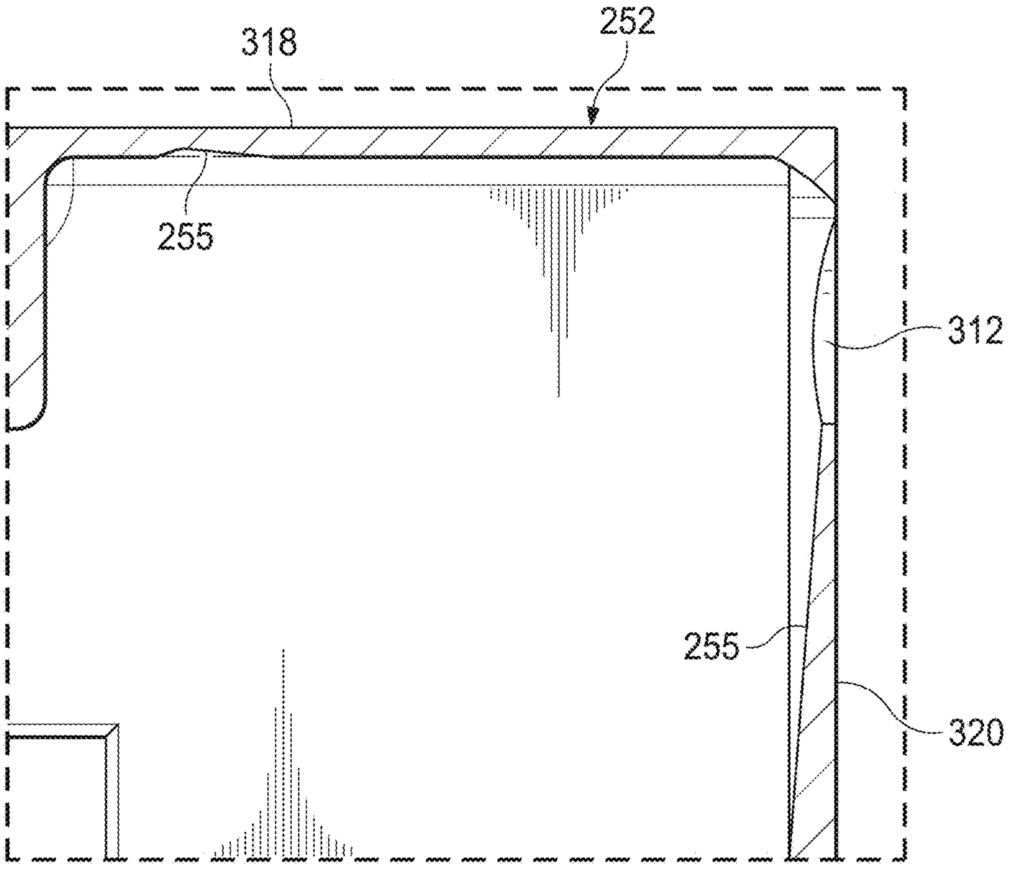
FIG. 10B is a magnified cross-sectional view of area G in FIG. 10A of the housing of the adjustable breakout device according to an embodiment of the present disclosure.

FIG. 6 shows an exploded view of the adjustable breakout device 250 which is suitable for use with the telescoping door system 110. In some implementations, the breakout device 250 includes a housing 252, an inner block 253, a vertical extrusion cover 254, a set screw 256, a top bolt 257, a support bar 258, a U bracket 260, and a dowel pin 266. In one implementation, the support bar 258 has a generally round surface and is formed from steel with a length of about 20 inches long and a diameter of 1⅜ inches. The sides of the support bar 258 may be ground flat symmetrically from the top to a depth of about 3⅜ inches to form flat regions 259. The width across these flat regions 259 may be about 13/16 inches. At the bottom of these flat regions, a U bracket 260 may be attached to the round bar 258 via a high strength dowel pin 266 that passes through both legs of the U bracket 260 and the middle of the flat regions 259 of the support bar 258 such that the support bar 258 can swing around the dowel pin 266 with a swept angle of about 24 degrees. At the top of the support bar 258, a threaded through hole may be formed to accommodate a set screw 256, which in one example is a ½"-13 set screw with an axis 9/32 inch from the top, parallel to the flat regions 259 and horizontally equidistant from them. In some implementations a top bolt 257 may be configured to pass through a hole 259 in the housing 252. The top bolt may be held in place by a inner block 253 with a threaded hole. In some implementations, the inner block is formed from metal, such as steel. FIGS. 7 and 8 show various perspective views of the adjustable breakout device 250.

Figure 15A:
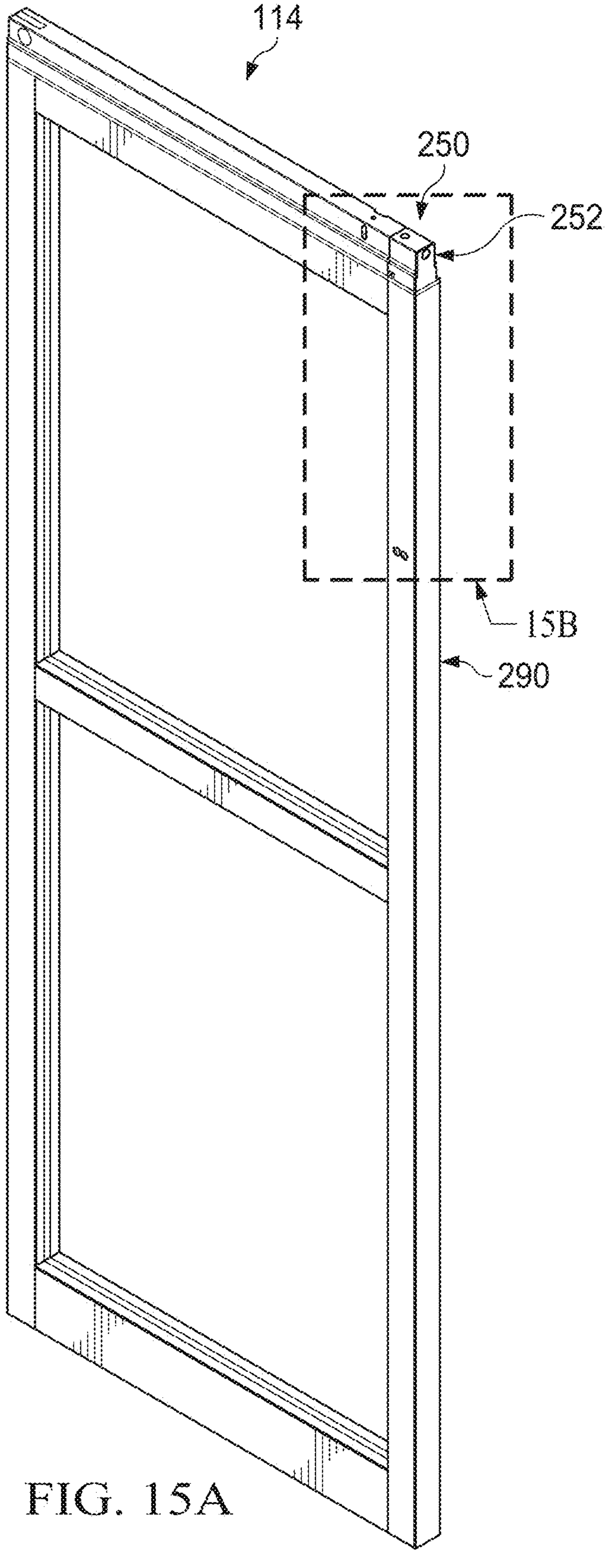
FIG. 15A is a perspective view of a door panel of the door assembly according to an embodiment of the present disclosure.
Figure 15B:
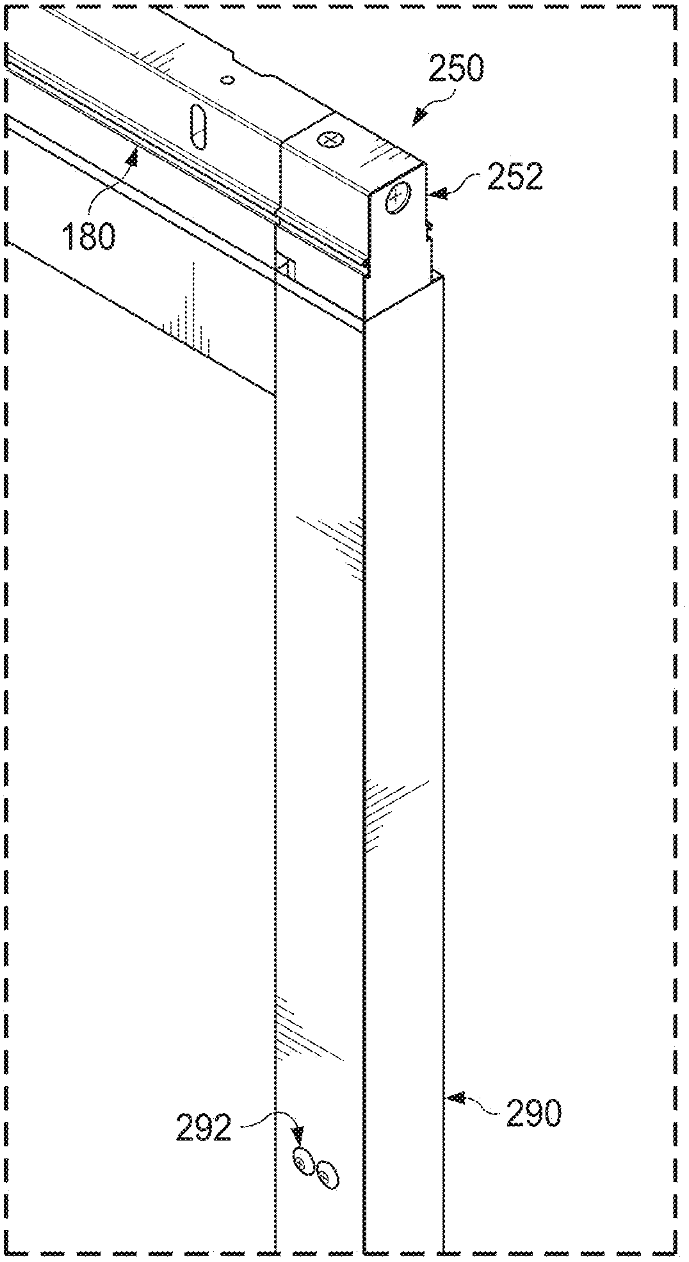
FIG. 15B is a magnified view of area O in FIG. 15A of a door panel of the door assembly according to an embodiment of the present disclosure.

FIGS. 9A-9E shows various perspective views of the housing 252. In some implementations, the housing 252 encloses the U bracket 262, the areas where the support bar 258 attaches to the U bracket 260, the area at the top of the U bracket 260 with the flat area 259, and the set screw at the top of the support bar 258. The housing 252 may be formed from a metal, such as cast aluminum. The housing 252 may include a top hole 259 as well as a hole 312 passing through a bottom section through which the set screw 256 at the top of the support bar 258 can be accessed and turned using a tool such as an ¼ inch Allen wrench. This hole 312 may have a ½ inch diameter. Further perspective and cross-section views of the housing 252 are shown in FIGS. 21 and 22. In the embodiment show in FIGS. 10A and 10B (which is a magnified view G of FIG. 10A), recessed areas 255 are disposed in the top and rear walls 318, 320 of the housing 252 which may accommodate rotation of the set screw 256 (shown in FIGS. 11B and 11C). The housing 252 may also include protrusions 314 which may be sized and configured to receive an engaging rail 180 of the door panel 114 (as shown in FIGS. 15A and 15B).

Figure 11A:
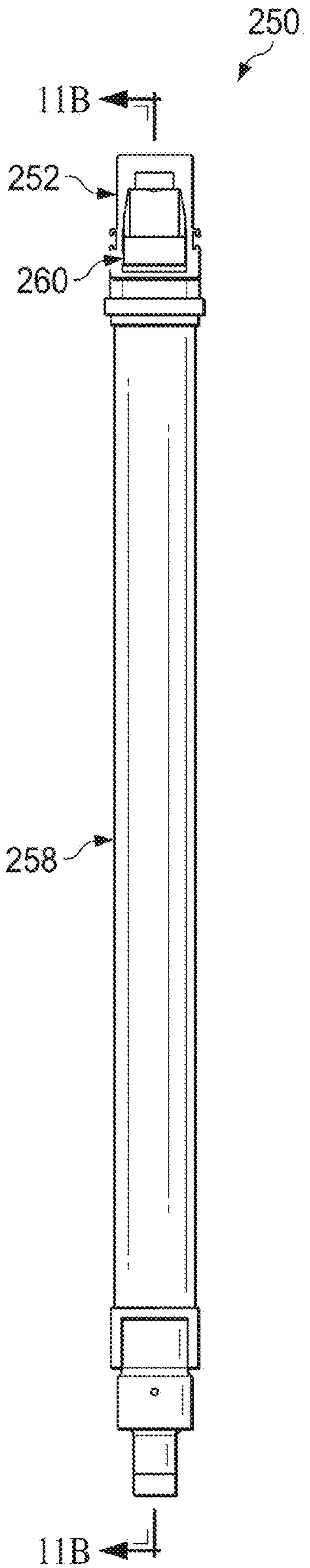
FIG. 11A is a perspective view of the adjustable breakout device according to an embodiment of the present disclosure.
Figure 11B:
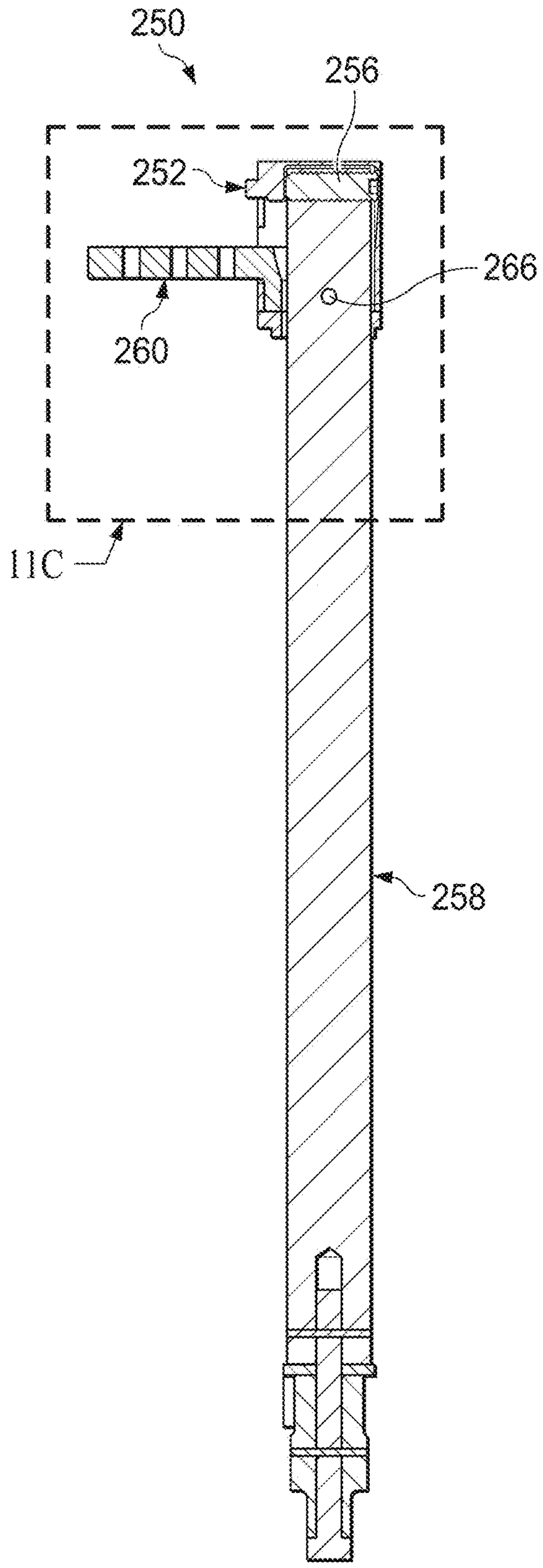
FIG. 11B is a cross-sectional view of the adjustable breakout device along line H according to an embodiment of the present disclosure.
Figure 11C:
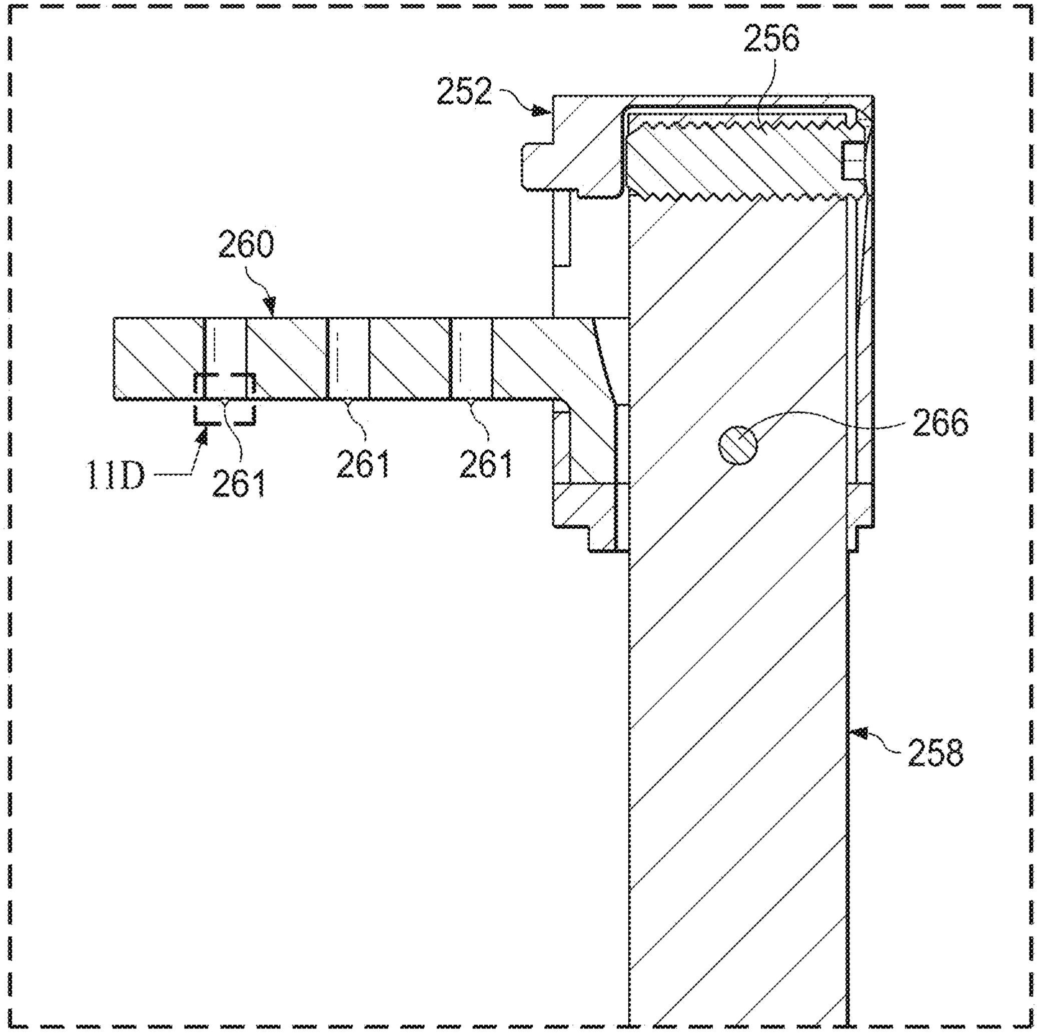
FIG. 11C is a magnified cross-sectional view of area J in FIG. 11B of the adjustable breakout device according to an embodiment of the present disclosure.
Figure 11D:
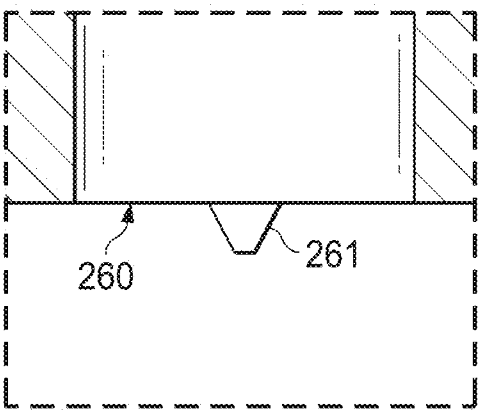
FIG. 11D is a magnified cross-sectional view of area K in FIG. 11C of the adjustable breakout device according to an embodiment of the present disclosure.
Figure 12A:
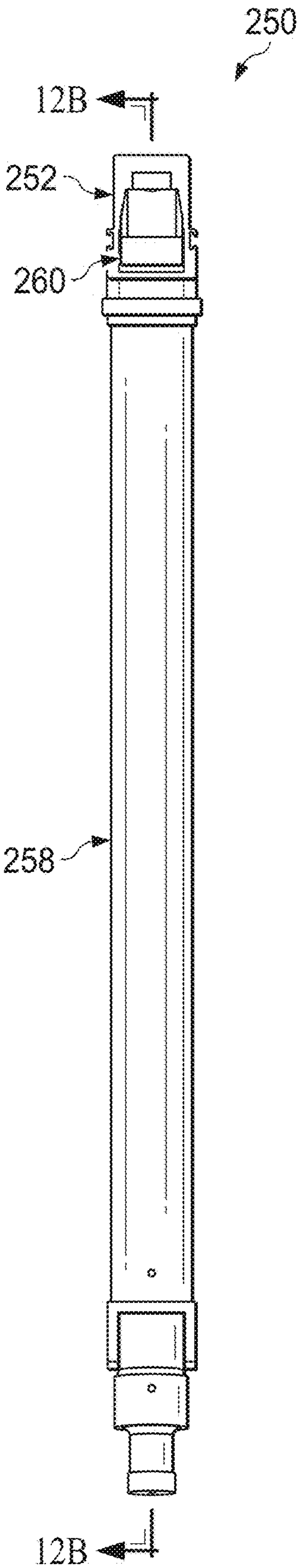
FIG. 12A is a perspective view of the adjustable breakout device according to an embodiment of the present disclosure.
Figure 12B:
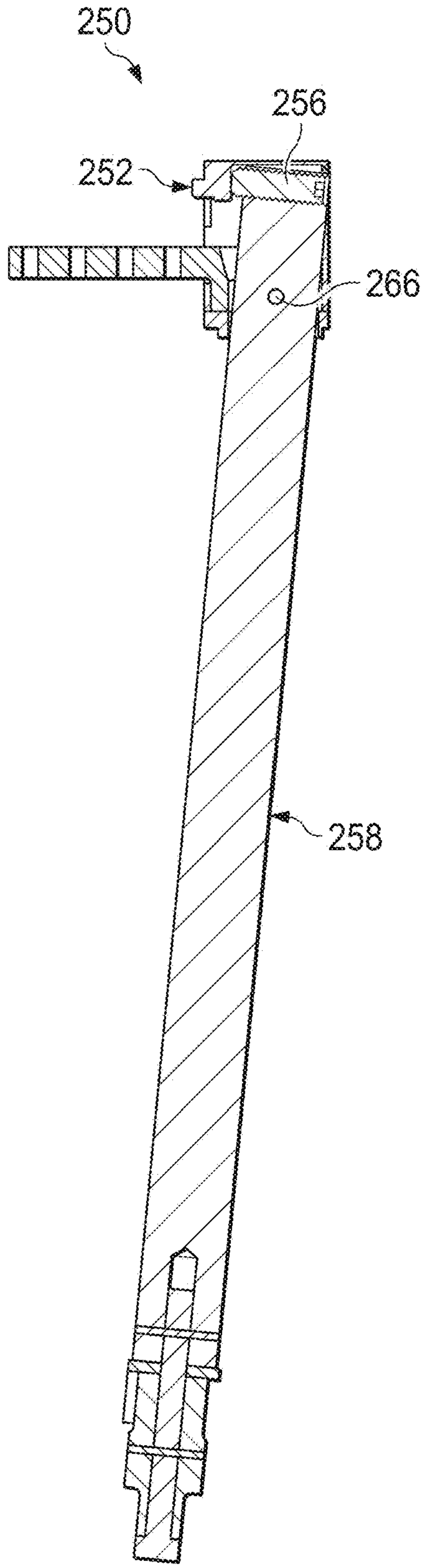
FIG. 12B is a cross-sectional view of the adjustable breakout device along line L according to an embodiment of the present disclosure.

Adjustment of the breakout device 250 is shown in FIGS. 11A-11D and 12A-12B. FIG. 11B is a cross-sectional view of the breakout device shown in FIG. 11A along line H showing the set screw 256 is profile. FIG. 11C shows a magnified portion J of the adjustable breakout device 250 with the set screw 256 that has not been tightened. In comparison, FIG. 12B shows a cross-sectional view along line L of the breakout device 250 in FIG. 12A where the set screw 256 has been tightened. When the set screw 256 is tightened, it applies pressure to the interior of the housing 252, causing the support bar 258 to pivot around the dowel pin 266. This may in turn result in changing the angle of the support bar 258 and consequently be used to increase the strength or capacity of the panels of the telescoping door. FIG. 11D shows a magnified portion K of a small protrusion 261 that may extend out from the bottom side of the U bracket 260 that dig into the frame of the door panel to prevent slipping. Protrusions 261 may be disposed across the bottom side of the U bracket 260.

Figure 13A:
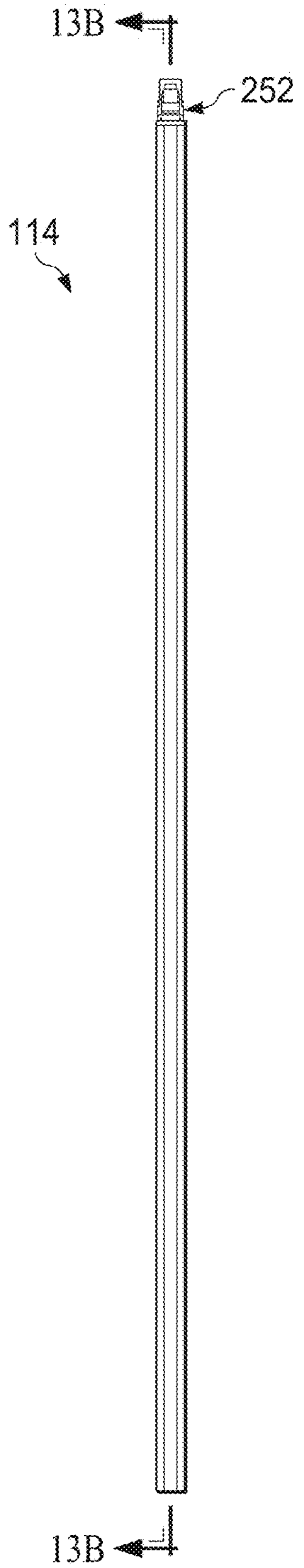
FIG. 13A is a side perspective view of a door panel of the door assembly according to an embodiment of the present disclosure.
Figure 13B:
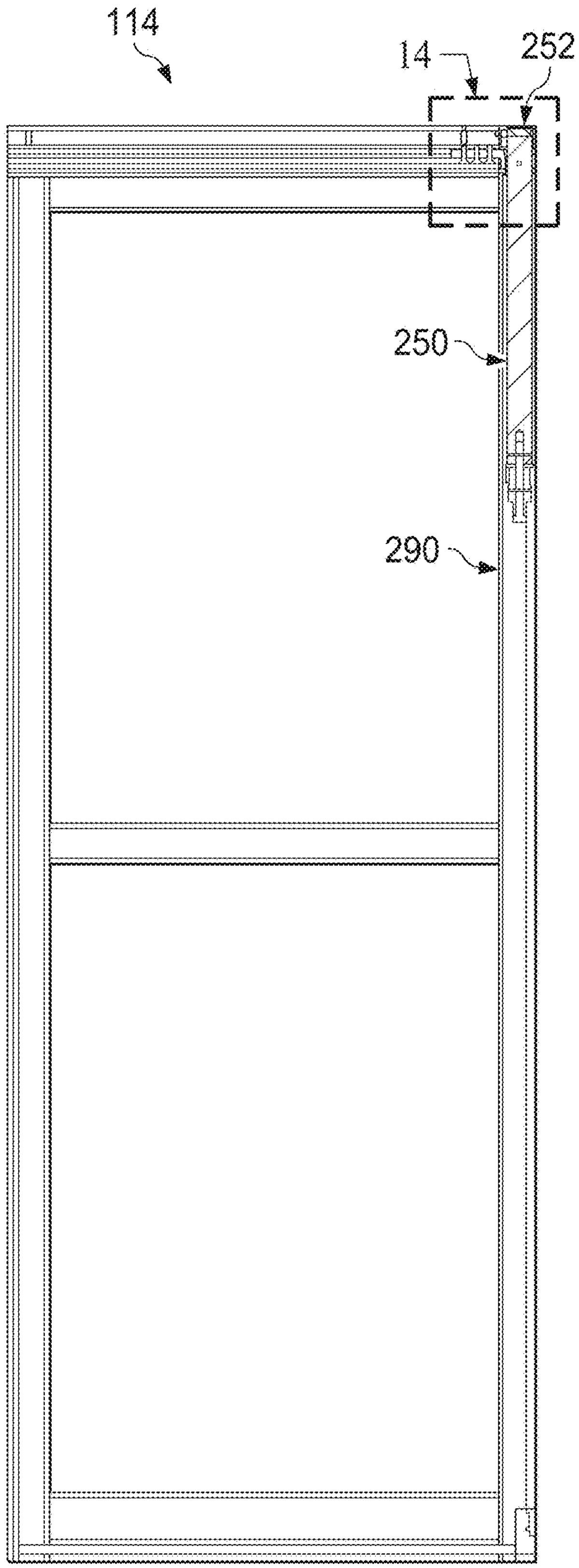
FIG. 13B is a cross-sectional view of a door panel of the door assembly along line M according to an embodiment of the present disclosure.

FIG. 13B is a cross-section view of a door panel 114 shown in FIG. 13A along line M showing the placement of the adjustable breakout device 250. In some embodiments, the adjustable breakout device 250 is positioned in a top portion of the door panel, such when pressure is applied by adjusting the set screw 256, the position of the door panel 114 may be adjusted.

Figure 14:
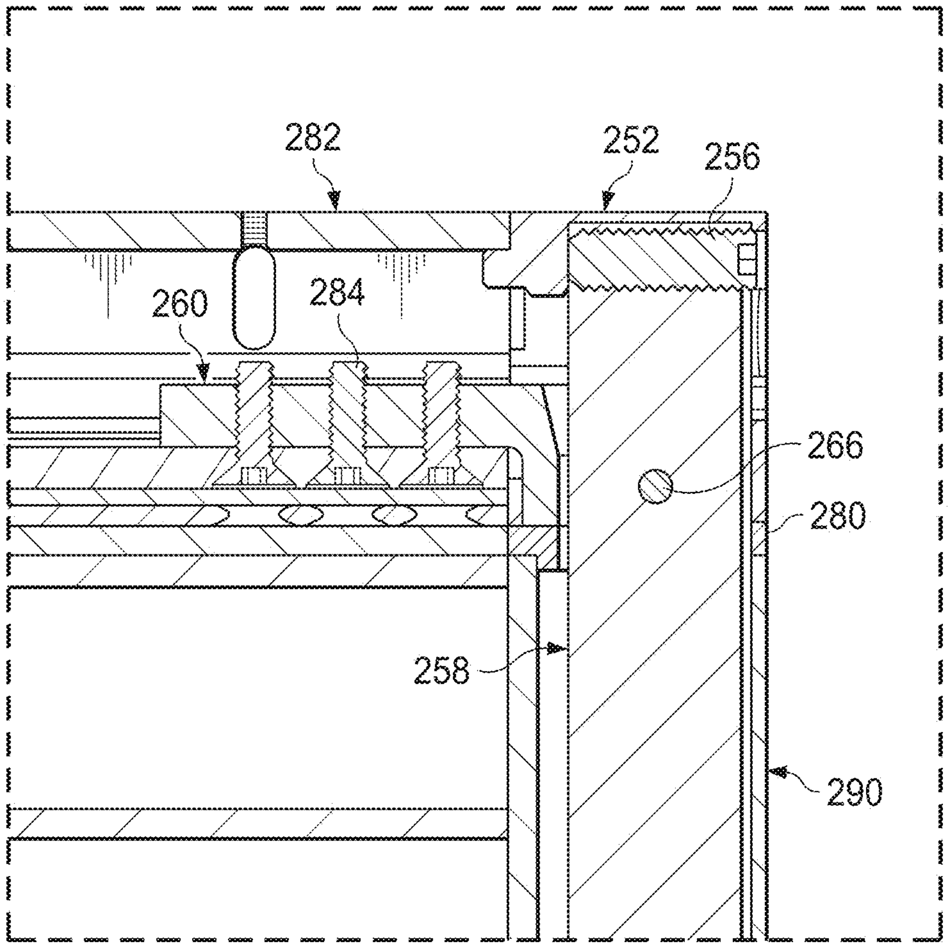
FIG. 14 is a magnified cross-sectional view of area N in FIG. 13B of the adjustable breakout device according to an embodiment of the present disclosure.

Aspects of the adjustable breakout device 250 are shown in more detail in FIG. 14 which is a magnified portion N of FIG. 13B. The adjustable breakout device 250 may be integrated with the rest of the door panel 114 by the rest of the length of the support bar 258 going into the pivot vertical rail 290 of the door and may be screwed to it. Further, the support bar 258 may be attached to the rail 290 via a U bracket 262 that rotates around the axis of the bar, allowing for the door panel to rotate around the support bar 258. The U bracket 262 may protrude out from the housing 252 and may be sized to fit into a hollow of the wheel carriage extrusion or engaging rail 180 (also shown in FIG. 15B) and may be screwed to it using three socket cap screws 284, which in one embodiment are 5⁄16"-18 flat head socket cap screws. This placement may pull the housing 252 firmly against the heel of the wheel carriage extrusion 282. In some embodiments, the housing 252 has the same general external cross-sectional profile as the wheel carriage extrusion 282. FIG. 31 also shows a vertical extrusion cover 280. The position of the adjustable breakout device 250 within the door panel 114 is further shown in FIGS. 33, which is an enlarged view of a portion of FIG. 32, and in particular, enlarging the portion encircled by circle B in FIG. 32.

In some embodiments, the adjustable breakout device 250 is attached to a door panel via three socket cap screws 284 (which may be 5⁄16"-18 flat head socket cap screws) which attach the U bracket 260 to the engaging rail 180 and two socket cap screws 292 (shown in FIG. 22B, which may be ¼"-20 button head socket cap screws) that attach the support bar 258 to the vertical pivot rail 290.

Figure 16:
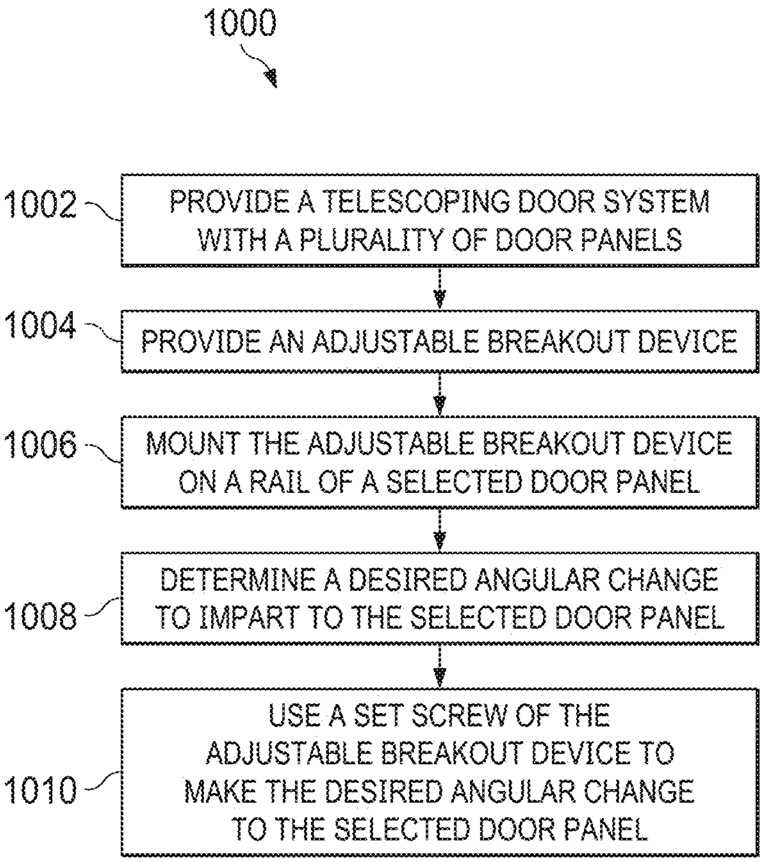
FIG. 16 is a flowchart illustrating a method for using a telescoping door system with an adjustable breakout device according to embodiments of the present disclosure.

FIG. 16 shows a flowchart illustrating a method 1000 for using a telescoping door system with an adjustable breakout device according to embodiments of the present disclosure. The adjustable breakout device may be the adjustable breakout device 250 described in FIGS. 1-15.

The method 1000 may include block 1602 to provide a telescoping door system with a plurality of door panels such as telescoping door system 110 with panels 114, 116, 118 as discussed in reference to FIGS. 1-15. In some implementations, this telescoping door system may be configured to breakout such that the door panels may be pivoted from the normal sliding configuration to a breakout configuration. This may provide additional clearance in the doorway of the telescoping door system.

The method 1000 may also include block 1004 to provide an adjustable breakout device. This adjustable breakout device may be the adjustable breakout device 250 discussed in reference to FIGS. 6-15B. The adjustable breakout device may include a housing, a support bar, a U bracket, and a set screw as discussed previously. In some implementations, the adjustable breakout device is built into a door panel of the telescoping door system during manufacturing and adjusted to the desired angle or strength during installation of the door panel.

The method 1000 may also include block 1006 to mount the adjustable breakout device a rail of a selected door panel of the plurality of door panels. In some implementations, the adjustable breakout device is configured to be mounted to a vertical rail of the selected door panel in the configuration shown in FIGS. 13A-15B.

The method 1000 may also include block 1008 to determine a desired angular change to impart to the selected door panel. For example, the selected door panel may imbalanced and may require an adjustment the angle at which it hangs to for optimal use with the rest of the telescoping door system.

The method 1000 may also include block 1010 to use a set screw of the adjustable breakout device to make the desired angular change to the selected door panel of the telescoping door system. In some implementations, when the set screw is tightened, it applies pressure to the interior of the housing of the adjustable breakout system which in turn may cause and angular change in the support bar. This motion may impart a similar angular change to the selected door panel, adjusting it by an angular change. This step may be used once or more (i.e, iteratively) to impart the desired angular changed to the selected door panel. In some implementations, the method 1000 may be used to adjust multiple panels of a telescoping door system, for example to adjust each panel to functional optimally with the others.

While the disclosure has been described in terms of exemplary aspects, those skilled in the art will recognize that the disclosure can be practiced with modifications in the spirit and scope of the appended claims. These examples given above are merely illustrative and are not meant to be an exhaustive list of all possible designs, aspects, applications or modifications of the disclosure.

I claim:

1. An adjustable breakout device for use with a sliding door system, the adjustable breakout device comprising:

a support bar configured to extend vertically with respect to a door panel of the sliding door system;

a housing configured to be mounted on an upper portion of the support bar;

a bracket configured to be mounted on the upper portion of the support bar and within a portion of the housing;

a set screw configured to pass through the housing and through the upper portion of the support bar, such that the set screw bears against a proximal end of the housing; and a pivot configured to pass through the bracket and the support bar, wherein when the set screw is turned to put pressure on the proximal end of the housing, the support bar rotates about the pivot.

2. The adjustable breakout device of claim 1, wherein the support bar is configured to be mounted within a vertical rail of the door panel of the sliding door system.

3. The adjustable breakout device of claim 2, wherein the support bar rotating about the pivot imparts a change in a suspension angle of the door panel.

4. The adjustable breakout device of claim 1, wherein the pivot is configured to pass through a first protrusion of the bracket, and a second protrusion of the bracket, respectively.

5. The adjustable breakout device of claim 4, wherein the first protrusion and the second protrusion of the bracket form a U shape configured to extend around the support bar.

6. The adjustable breakout device of claim 5, wherein the bracket further comprises a bar extending approximately horizontally with respect to the door panel, the bracket comprising a proximal end of which is connected to the U shape formed by the first and second protrusions of the bracket.

7. The adjustable breakout device of claim 6, wherein the bar of the bracket is configured to be mounted to a horizontal rail of the door panel.

8. The adjustable breakout device of claim 4, wherein the upper portion of the support bar comprises a first flat region and a second flat region on an opposite side of the support bar as the first flat region.

9. The adjustable breakout device of claim 8, wherein the first protrusion is aligned with the first flat region and the second protrusion is aligned with the second flat region.

10. The adjustable breakout device of claim 8, wherein the housing comprises a first sidewall and a second sidewall opposite the first sidewall, wherein the first sidewall is aligned with the first flat region and the second sidewall is aligned with the second flat region.

11. The adjustable breakout device of claim 10, wherein the housing comprises a third sidewall perpendicular to the first and second sidewalls, wherein the third sidewall comprises a first hole that is sized for the set screw to pass therethrough.

12. The adjustable breakout device of claim 11, wherein the set screw is configured to pass through the first hole of the housing and through a second hole in the upper portion of the support bar passing between the first and second flat regions.

13. A sliding door system with breakout functionality, comprising:

a first door panel configured to be mounted to a top rail, the first door panel comprising a first pivot point about which the first door panel is configured to rotate in a breakout procedure;

a second door panel configured to be mounted to the top rail, the second door panel configured to slide linearly with respect to the first door panel, the second door panel comprising a second pivot point about which the second door panel is configured to rotate in a breakout procedure;

an adjustable breakout system mounted on a vertical rail of the second door panel, the adjustable breakout system comprising:

a support bar configured to extend along the vertical rail of the second door panel;

a housing configured to be mounted on an upper portion of the support bar;

a bracket configured to be mounted on the upper portion of the support bar and within a portion of the housing;

a set screw configured to pass through the housing and through the upper portion of the support bar, such that the set screw bears against a proximal end of the housing; and a pivot configured to pass through the bracket and the support bar, wherein when the set screw is turned to put pressure on the proximal end of the housing, the support bar rotates about the pivot.

14. The sliding door system of claim 13, wherein the bracket comprises a first protrusion and a second protrusion forming a U shape that is configured to extend around the support bar.

15. The sliding door system of claim 14, wherein the bracket further comprises a bar extending approximately horizontally, the proximal end of which is connected to the U shape formed by the first and second protrusions of the bracket.

16. The sliding door system of claim 15, wherein the bar of the bracket is configured to be mounted to a horizontal rail of the second door panel.

17. The sliding door system of claim 13, wherein the upper portion of the support bar comprises a first flat region and a second flat region on an opposite side of the support bar as the first flat region.

18. The sliding door system of claim 17, wherein a first protrusion of the bracket is aligned with the first flat region and a second protrusion of the bracket is aligned with the second flat region.

19. The sliding door system of claim 13, wherein an angle at which the second door panel hangs with respect to the top rail is changed when the set screw is turned, which in turn causes the support bar to rotate about the pivot.

20. A method for adjusting a sliding door system with breakout functionality, comprising:

providing a door panel of the sliding door system, the door panel suspended from a mounting rail;

providing an adjustable breakout device mounted on the door panel, the adjustable breakout device comprising a support bar configured to extend vertically along the door panel, a housing configured to be mounted on an upper portion of the support bar, a bracket configured to be mounted on the upper portion of the support bar and within a portion of the housing, a set screw configured to pass through the housing and through the upper portion of the support bar, and a pivot configured to pass through the bracket and the support bar;

determining a desired angular change to an angle at which the door panel is suspended from the mounting rail; and turning the set screw of the adjustable breakout device to bear against an inner wall of the housing with a steel block to change the angle at which the door panel is suspended from the mounting rail to achieve the desired angular change.

* * * * *